April 6, 1954
G. L. DENISTON
2,674,517
DEXTRAN FILAMENT MANUFACTURE
Filed Aug. 8, 1951
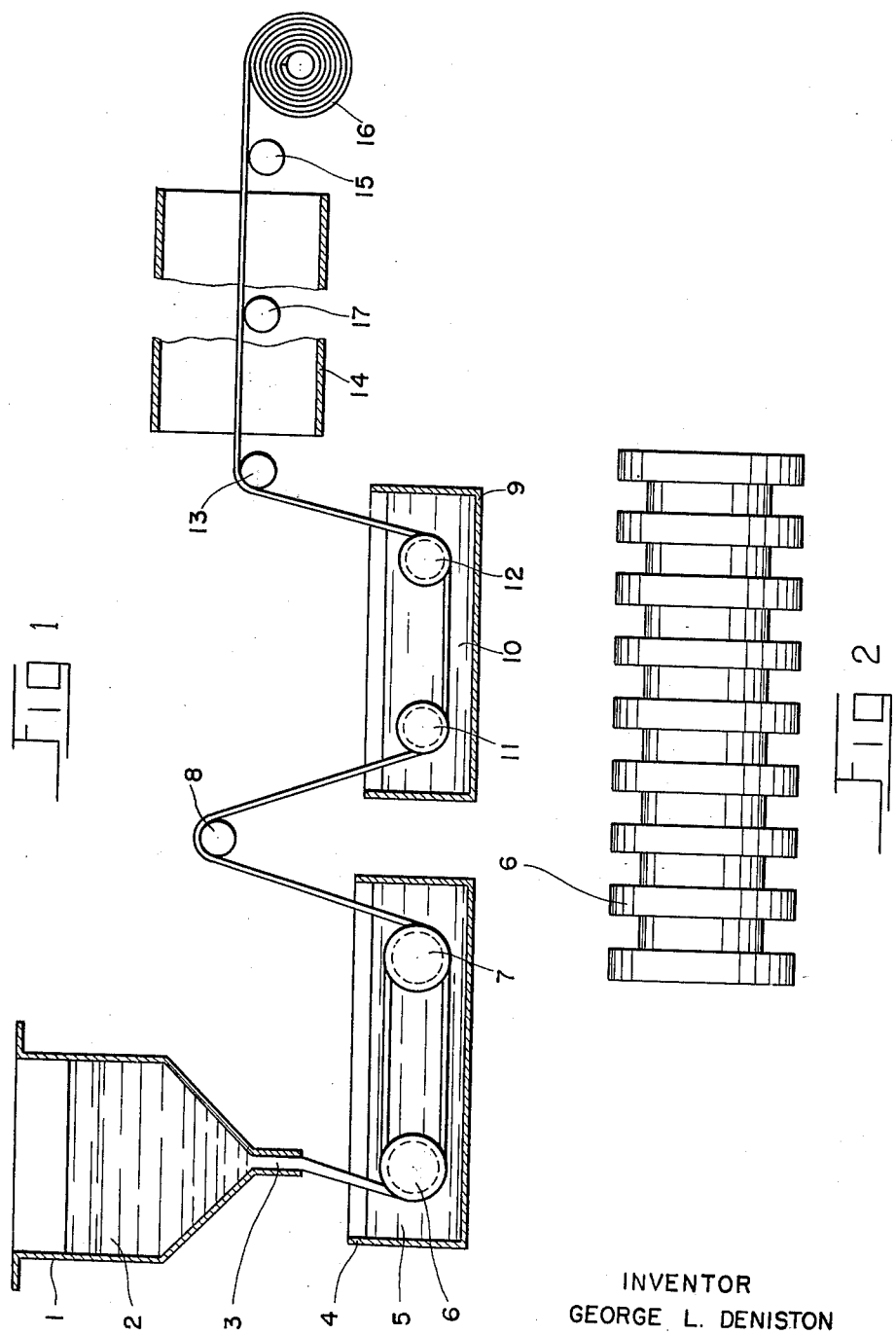
INVENTOR
GEORGE L. DENISTON
by Toulmin & Toulmin
ATTORNEYS Patented Apr. 6, 1954

2,674,517

UNITED STATES PATENT OFFICE 2,674,517

DEXTRAN FILAMENT MANUFACTURE

George L. Deniston, Dayton, Ohio, assignor to The Commonwealth Engineering Company of Ohio, Dayton, Ohio, a corporation of Ohio Application August 8, 1951, Serial No. 240,829

20 Claims. (Cl. 18—54)

This invention relates to the production of filaments and more particularly to the production of a resinated hydrolyzed dextran monofilament and the method of attaining the same.

The present invention contemplates the provision of a new and novel fiber having as the basic material a polysaccharide. The invention further contemplates the provision of a new and novel process utilizable for the attainment of the fiber of invention.

More particularly the invention conceives the incorporation of a water soluble resin material into a water soluble polysaccharide to form a viscous mass which may be extruded under pressure and thereafter passed into a liquid medium which acts to polymerize the resin and firmly set the extruded filament, complete polymerization being effected by a subsequent heating step. The filament produced is capable of use as a monofilament having a diameter of about ¼″ to ⅜″, but finer filaments having a diameter in the range of .002 to .004 are within the contemplation of the invention if precautions are taken to insure of immediate gathering of the fine filaments into a tow directly after polymerization of the resin.

The dextran referred to is a polysaccharide produced by the action of micro-organisms on a suitable culture medium, and may be prepared by forming a mixture containing sucrose that is in the form of crude sugar, molasses or the like, together with nitrogen in the form of commercial peptone, beef extract or other similar material, and salts such as dipotassium phosphate and sodium chloride and inoculating with *Leuconostoc mesenteroides* or *Leuconostoc dextranicum*. A typical medium may contain 5 to 10% of sucrose, 0.1% of peptone, 0.2% of dipotassium phosphate, and 0.1% of sodium chloride. The pH of the medium is adjusted preferably slightly on the alkaline side of neutrality.

The inoculated culture may be incubated at a temperature most favorable to the growth of the micro-organism being used. For *L. mesenteroides* a temperature of about 25° C. is suitable. When the fermentation has been completed the polysaccharide formed is precipitated from the culture by the addition thereto of alcohol or acetone. The precipitate may be purified by further washing with alcohol or acetone.

The dextran thus produced may be redissolved and hydrolyzed with acid and the solution fractionated by treatment with isopropyl alcohol to remove the high molecular constituents, leaving a dextran having a molecular weight in the range of 50,000 to three million, which is the desired range for the material utilized in the practice of this invention.

A particularly suitable water soluble resin for the practice of invention is urea formaldehyde. While urea formaldehyde condensation products are preferred, melamine formaldehyde may also be utilized. In the practice of the invention these resins are simply mixed together with a mass of dextran and water until complete dispersion of the resins throughout the mass is attained.

The liquid medium which effects polymerization of the resin is acidic in nature and may be weakly or strongly acid in character depending upon the time of exposure of the dextran resinate thereto, and also upon the proportion of dextran relative to the resin quantity. The latter factor is particularly important where the dextran is present in the composition in large proportions, that is, greater than about 75% by dry weight, as the resultant mixture under these conditions may tend to dissolve in strong acids. The media which are particularly useful in the practice of the invention are those which have a slightly acidic nature and act as precipitating media for hydrolyzed dextran from aqueous solution. Thus acetone due to the acidic character of the alpha hydrogen may act to polymerize the resin and also serve to retain the extruded composition in an integral unit. The lower aliphatic alcohols such as methyl, ethyl and propyl acidified with a strong acid to the extent of between about 5–8 parts by weight of the acid may be utilized. Alternatively, weak organic acids such as 0.1 normal acetic may be employed where the exposure time of the extruded composition is low and the percent by weight of dextran in the composition less than about 50%. Boric acid or lactic acid may also be employed. Salts which yield a free acid upon heating, such as ammonium salt and ammonium sulfate, may also be utilized and these act to effect complete polymerization in the heating step.

The invention will be more fully understood by reference to the following specific examples and the figures of the drawing wherein:

Figure 1 is a diagrammatic representation of the apparatus used in the process of invention; and Figure 2 illustrates a grooved roller.

Referring to the drawing there is shown diagrammatically at 1 a spinneret container having therein a composition containing the water soluble dextran and the water soluble resin as indicated at 2. This composition comprises:

EXAMPLE I

Dextran composition

| | Per cent by weight |
|---|---|
| Dextran (average molecular weight of 100,000) | 60 |
| Water | 40 |

Resin composition

| | |
|---|---|
| Water soluble urea formaldehyde | 50 |
| Water | 50 |

Pressure is applied to the mass at 2 by suitable means (not shown) known to the art, to cause extrusion of filament 3 which is immediately passed into a bath 5 of acetone contained in tank 4.

The extruded filament as it enters the bath 5 is quite stable and further stability is engendered by the action of the acetone which also begins immediately to polymerize the resin.

The filament while having strength will nevertheless be moderately plastic and is immediately wound around grooved roll 6 (Figure 2) and passed through the acetone to another grooved roll 7. Each of rolls 6 and 7 may be driven in synchronism and each may have 8 to 10 grooves. The driving speed of the rolls and the number of grooves employed will determine the time of contact of the filament with the acetone, the time generally increasing with the degree of polymerization required in this stage.

Where required, the roll 7 may be driven at a slightly greater peripheral speed than the roll 6, thus stretching the filament during the polymerization process and effecting an alignment of the molecules. Normally this practice may be employed and is recommended for all proportions of the composition making up the filament.

The time of contact employing the proportions of the constituents indicated above may be on the order of 7 to 9 minutes. The polymerization effected under these conditions is not complete but of the order to render the filament quite stable for further handling.

The filament is passed from the acetone bath over roll 8 into a water bath 10 contained in tank 9, rolls 12 and 11 which are similar to rolls 6 and 7 being used to support the passage. This water treatment removes the acetone which might be detrimental to the filament under the high temperature conditions employed in the final polymerization step.

The filament free of acetone is passed through oven 14 operating at a temperature in the range of about 150° to 250° C. being supported in the passing on rolls 13 and 15, whereafter it is wound up on roll 16. The oven temperature and speed may be coordinated to effect complete polymerization, a desirable temperature and speed relation in the present instance being a temperature of about 200° C. at a speed of about 2 feet per minute, the length of the oven being about 18 feet. Where the oven traverse is long, as indicated in this instance, the filament may be supported intermediate the oven ends by additional rolls as at 17, or may even be transported on an open mesh screen.

The procedure of invention is similar in the preparation of finer fibers except the fibers of small diameter are, upon extrusion, blown into a tow before passing into the acetone, in the manner known to the art.

EXAMPLE II

Melamine formaldehyde, water soluble, may be employed and a preferable composition in this instance may consist of:

Dextran composition

| | Per cent by weight |
|---|---|
| Dextran (average molecular weight of 350,000) | 85 |
| Water | 15 |

Resin composition

| | |
|---|---|
| Water soluble melamine formaldehyde | 70 |
| Water | 30 |

The bath 5 may be acidified ethyl alcohol containing by weight about 94 parts of alcohol and 6 parts by weight of 0.1 N $HC_1$. The time of passage of the filament through this bath with the above composition may be about 3 to 5 minutes and the oven time may be about 6 to 8 minutes at a temperature of about 225° to 250° C.

EXAMPLE III

An alkylated urea formaldehyde resin may be employed with the dextran in the following proportions:

Dextran composition

| | Per cent by weight |
|---|---|
| Dextran (average molecular weight of 350,000) | 85 |
| Water | 15 |

Resin composition

| | |
|---|---|
| Water soluble alkylated urea formaldehyde | 80 |
| Water | 20 |

The bath 5 may preferably contain 0.1 normal acetic acid and the time of passage therethrough regulated to about 3 to 5 minutes. After washing with water the filament may be treated at a temperature of about 235° C. in the oven, the time of treatment being about 2 to 4 minutes.

EXAMPLE IV

A methylated methylol urea formaldehyde water soluble resin may be employed with the dextran in the following proportions:

Dextran composition

| | By weight |
|---|---|
| Dextran (average molecular weight 3 million) | 40 |
| Water | 60 |

Resin composition

| | |
|---|---|
| Methylated methylol urea formaldehyde | 65 |
| Water | 35 |

The bath 5 may contain a Molal solution of ammonium sulphate having about 0.5 of an equivalent of sulfuric acid. The time of passage through the solution may be regulated to about 2 minutes, and after washing may be exposed to an oven temperature of about 250° C. for about 3 minutes to firmly set the filament.

It is to be understood that in the foregoing examples the water component is added in varying amounts to assist in the formation of the viscous material and that the water does not form a part of the reaction and may be drawn off prior to extrusion where used in considerable excess. For example, at higher molecular weights of the dextran a larger amount of water is desirable to secure complete dispersion of the resin in the dextran. Thus the viscous mass may be formed by completely solving both primary constituents and heating the solution at about 100° C. to boil off sufficient water to form the required viscous extrusion material. Temperatures of 130° C. must not be exceeded however as premature polymerization may then occur.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of the disclosure and the scope of the appended claims.

I claim:

1. A filament having a dextran base comprising the acid reaction product of dextran and a water soluble resin selected from the group consisting of urea formaldehyde, melamine formaldehyde and their ethers.

2. A filament having a dextran base comprising the acid reaction product of dextran having a molecular weight in the range of 50,000 to three million and a water soluble resin selected from the group consisting of urea formaldehyde, melamine formaldehyde and their ethers.

3. A filament having a dextran base comprising the acid reaction product of dextran and a water soluble urea-formaldehyde resin.

4. A filament having a dextran base comprising the acid reaction product of dextran and a water soluble melamine-formaldehyde resin.

5. A filament having a dextran base comprising the acid reaction product of dextran and an alkylated urea formaldehyde resin.

6. A filament having a dextran base comprising the acid reaction product of dextran and an alkylated alkylol melamine formaldehyde resin.

7. A filament having a dextran base comprising the acid reaction product of dextran and a methylated methylol melamine formaldehyde resin.

8. A filament having a dextran base comprising the acid reaction product of dextran having an average molecular weight of 100,000, and a water soluble urea formaldehyde resin.

9. A filament having a dextran base comprising the acid reaction product of dextran having an average molecular weight of 350,000, and a water soluble melamine formaldehyde resin.

10. A filament having a dextran base comprising the acid reaction product of dextran having an average molecular weight of 350,000, and a water soluble alkylated urea formaldehyde resin.

11. A method of producing a filament from a dextran base wherein dextran is reacted with a water soluble resin selected from the group consisting of urea-formaldehyde, melamine-formaldehyde and their ethers and the product is extruded to the shape of a filament and treated with a medium having an acid reaction to form the said filament.

12. A method of producing a filament from a dextran base wherein dextran having an average molecular weight of 100,000 is reacted with a water soluble urea formaldehyde resin and the product is extruded to the shape of a filament and treated with acetone to form the said filament.

13. A method of producing a filament from a dextran base wherein dextran having an average molecular weight of 350,000 is reacted with a water soluble melamine formaldehyde resin and the product is extruded to the shape of a filament and treated with an acidified alcohol to form the said filament.

14. A method of producing a filament from a dextran base wherein dextran having an average molecular weight of 350,000 is reacted with a water soluble alkylated urea formaldehyde resin and the product is extruded to the shape of a filament and treated with acetic acid with a normality of approximately 0.1 to form the said filament.

15. A method of producing a filament from a dextran base comprising the steps of forming an aqueous viscous mass of dextran and a water soluble resin selected from the group consisting of urea-formaldehyde, melamine-formaldehyde and their ethers, extruding the mass into filamentary form, setting the filament in an acidic bath, and heating the said filament.

16. A method of producing a filament from a dextran base comprising the steps of forming to the shape of a filament an aqueous viscous mass of dextran and a water soluble resin selected from the group of urea-formaldehyde, melamine-formaldehyde and their ethers, and the polymerization of which is facilitated under acidic conditions, passing the filament through an acid to set the mass, and thereafter heating the filament at a temperature in the range of about 200° to 250° C.

17. A method of producing a filament from a dextran base comprising the steps of forming to the shape of a filament an aqueous viscous mass of dextran and urea formaldehyde in substantially equal proportions by weight, passing the same through a bath having an acid reaction, and thereafter heating the said filament at a temperature of about 200° C.

18. A filament comprising the acid reaction product of about 85 parts by weight of dextran and about 70 parts by weight of melamine formaldehyde.

19. A filament comprising the acid reaction product of about 60 parts by weight of dextran and about 50 parts by weight of urea formaldehyde.

20. A filament comprising the acid reaction product of about 40 parts by weight of dextran and about 65 parts by weight of methylated methylol urea formaldehyde.

No references cited.